United States Patent
Ozawa et al.

(10) Patent No.: US 11,894,032 B2
(45) Date of Patent: Feb. 6, 2024

(54) MAGNETIC RECORDING MEDIUM HAVING CHARACTERIZED VERTICAL SFD, MAGNETIC TAPE CARTRIDGE, AND MAGNETIC RECORDING REPRODUCING DEVICE

(71) Applicant: FUJIFILM Corporation, Tokyo (JP)

(72) Inventors: Eiki Ozawa, Minamiashigara (JP); Takashi Fujimoto, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/191,983

(22) Filed: Mar. 29, 2023

(65) Prior Publication Data

US 2023/0238025 A1    Jul. 27, 2023

Related U.S. Application Data

(63) Continuation of application No. PCT/JP2021/034157, filed on Sep. 16, 2021.

(30) Foreign Application Priority Data

Sep. 30, 2020  (JP) .................. 2020-165802

(51) Int. Cl.
  *G11B 5/706*    (2006.01)
  *G11B 5/702*    (2006.01)
  *G11B 5/712*    (2006.01)

(52) U.S. Cl.
  CPC .......... *G11B 5/70642* (2013.01); *G11B 5/702* (2013.01); *G11B 5/712* (2013.01)

(58) Field of Classification Search
  None
  See application file for complete search history.

(56) References Cited

U.S. PATENT DOCUMENTS

| | | | | |
|---|---|---|---|---|
| 2012/0243120 A1* | 9/2012 | Harasawa | ............... | G11B 5/70 |
| 2018/0005737 A1 | 1/2018 | Sakane et al. | | |
| 2018/0240479 A1* | 8/2018 | Kasada | ............... | G11B 5/00813 |
| 2018/0240489 A1* | 8/2018 | Kasada | ............... | G11B 5/74 |
| 2018/0240493 A1* | 8/2018 | Tada | ............... | G11B 5/712 |
| 2018/0286444 A1* | 10/2018 | Kasada | ............... | G11B 5/70626 |
| 2018/0286448 A1* | 10/2018 | Ozawa | ............... | G11B 5/70615 |
| 2018/0286451 A1* | 10/2018 | Ozawa | ............... | G11B 5/584 |
| 2019/0103130 A1* | 4/2019 | Kasada | ............... | G11B 5/735 |
| 2020/0005817 A1 | 1/2020 | Ozawa et al. | | |
| 2020/0066302 A1 | 2/2020 | Terakawa et al. | | |
| 2020/0098390 A1 | 3/2020 | Terakawa et al. | | |
| 2023/0106585 A1* | 4/2023 | Kasada | ............... | G11B 5/7334 |
| | | | | 428/840 |
| 2023/0109470 A1* | 4/2023 | Kasada | ............... | G11B 5/65 |
| | | | | 360/77.12 |

FOREIGN PATENT DOCUMENTS

| | | |
|---|---|---|
| JP | 11250437 A  *  | 9/1999 |
| JP | 6010181 B2 | 10/2016 |
| JP | 2017-139044 A | 8/2017 |
| JP | 2020-009522 A | 1/2020 |
| WO | 2018/199105 A1 | 11/2018 |
| WO | 2018/203468 A1 | 11/2018 |

OTHER PUBLICATIONS

International Search Report dated Nov. 30, 2021 in International Application No. PCT/JP2021/034157.
Written Opinion dated Nov. 30, 2021 in International Application No. PCT/JP2021/034157.
International Preliminary Report on Patentability dated Mar. 28, 2023 with a Translation of the Written Opinion of the International Searching Authority in Application No. PCT/JP2021/034157.
Office Action dated Nov. 21, 2023 in Japanese Application No. 2022-553821.

* cited by examiner

*Primary Examiner* — Kevin M Bernatz
(74) *Attorney, Agent, or Firm* — Sughrue Mion, PLLC

(57) ABSTRACT

Provided are: a magnetic recording medium including a non-magnetic support and a magnetic layer containing a ferromagnetic powder, in which the ferromagnetic powder is an ε-iron oxide powder, a vertical switching field distribution SFD of the magnetic recording medium is 0.20 or more and 3.00 or less at a measurement temperature of 25° C., and an inclination of SFD obtained from SFD at a measurement temperature of 10° C., SFD at a measurement temperature of 25° C., and SFD at a measurement temperature of 40° C. is $0.003° C.^{-1}$ or more and $0.080° C.^{-1}$ or less; a magnetic tape cartridge including the magnetic recording medium which is a magnetic tape; and a magnetic recording and reproducing device including the magnetic recording medium.

19 Claims, No Drawings

MAGNETIC RECORDING MEDIUM HAVING CHARACTERIZED VERTICAL SFD, MAGNETIC TAPE CARTRIDGE, AND MAGNETIC RECORDING REPRODUCING DEVICE

CROSS-REFERENCE TO RELATED APPLICATIONS

This application is a Continuation of PCT International Application No. PCT/JP2021/034157 filed on Sep. 16, 2021, which claims priority under 35 U.S.C. § 119(a) to Japanese Patent Application No. 2020-165802 filed on Sep. 30, 2020. Each of the above applications is hereby expressly incorporated by reference, in its entirety, into the present application.

BACKGROUND OF THE INVENTION

1. Field of the Invention

The present invention relates to a magnetic recording medium, a magnetic tape cartridge, and a magnetic recording and reproducing device.

2. Description of the Related Art

A magnetic recording medium has been widely used as a data storage recording medium for recording and storing various pieces of data (see, for example, JP2017-139044A and JP6010181B).

SUMMARY OF THE INVENTION

In a magnetic recording medium, a magnetic layer containing a ferromagnetic powder is usually provided on a non-magnetic support. Regarding the ferromagnetic powder, for example, as disclosed in JP2017-139044A and JP6010181B, an ε-iron oxide powder has attracted attention in recent years.

A magnetic recording medium used for data storage application may be used in a data center in which a temperature is controlled. On the other hand, the data center is required to save power in order to reduce costs. In order to save power, it is desirable that control conditions of the temperature in the data center can be more relaxed than a current level or the controlling can be made unnecessary. In a case where the control conditions of the temperature are relaxed or the controlling is not performed, it is assumed that the magnetic recording medium is used in various temperature conditions, for example, in a temperature condition of about room temperature and a temperature condition of a higher temperature. Since the magnetic recording medium is required to always exhibit excellent electromagnetic conversion characteristics, a magnetic recording medium with less deterioration in electromagnetic conversion characteristics in a case of being used under different temperature conditions is desirable. However, according to the study by the present inventor, a magnetic recording medium containing an ε-iron oxide powder as the ferromagnetic powder tended to deteriorate in electromagnetic conversion characteristics in a case of being used under different temperature conditions.

An object of one aspect of the present invention is to provide a magnetic recording medium that contains an ε-iron oxide powder as a ferromagnetic powder and in which deterioration in electromagnetic conversion characteristics in use under different temperature conditions is suppressed.

One aspect of the present invention relates to a magnetic recording medium comprising: a non-magnetic support; and a magnetic layer containing a ferromagnetic powder, in which the ferromagnetic powder is an ε-iron oxide powder, a vertical switching field distribution SFD of the magnetic recording medium is 0.20 or more and 3.00 or less at a measurement temperature of 25° C., and an inclination of SFD obtained from SFD at a measurement temperature of 10° C., SFD at a measurement temperature of 25° C., and SFD at a measurement temperature of 40° C. is $0.003°\ C.^{-1}$ or more and $0.080°\ C.^{-1}$ or less. "SFD" is an abbreviation for switching field distribution. In the present invention and the present specification, the vertical switching field distribution is referred to as "SFD".

In one embodiment, the inclination of SFD may be $0.005°\ C.^{-1}$ or more and $0.050°\ C.^{-1}$ or less.

In one embodiment, the SFD at the measurement temperature of 25° C. may be 0.50 or more and 2.00 or less.

In one embodiment, the ε-iron oxide powder may contain a cobalt element.

In one embodiment, the ε-iron oxide powder may further contain an element selected from the group consisting of a gallium element and an aluminum element.

In one embodiment, the ε-iron oxide powder may further contain an element selected from the group consisting of a titanium element and a tin element.

In one embodiment, the magnetic recording medium may further comprise a non-magnetic layer containing a non-magnetic powder between the non-magnetic support and the magnetic layer.

In one embodiment, the magnetic recording medium may further comprise a back coating layer containing a non-magnetic powder on a surface side of the non-magnetic support opposite to a surface side on which the magnetic layer is provided.

In one embodiment, the magnetic recording medium may be a magnetic tape.

Another aspect of the present invention relates to a magnetic tape cartridge comprising the magnetic tape.

Still another aspect of the present invention relates to a magnetic recording and reproducing device comprising the magnetic recording medium.

According to one aspect of present invention, it is possible to provide a magnetic recording medium that contains an ε-iron oxide powder as a ferromagnetic powder and in which deterioration in electromagnetic conversion characteristics in use under different temperature conditions is suppressed. In addition, according to one aspect of the present invention, it is possible to provide a magnetic tape cartridge and a magnetic recording and reproducing device including the magnetic recording medium.

DESCRIPTION OF THE PREFERRED EMBODIMENTS

[Magnetic Recording Medium]

One aspect of the present invention relates to a magnetic recording medium including a non-magnetic support, and a magnetic layer containing a ferromagnetic powder. The ferromagnetic powder is an ε-iron oxide powder, a vertical switching field distribution SFD of the magnetic recording medium is 0.20 or more and 3.00 or less at a measurement temperature of 25° C. in the magnetic recording medium, and an inclination of SFD obtained from SFD at a measurement temperature of 10° C., SFD at a measurement temperature of 25° C., and SFD at a measurement temperature of 40° C. is 0.003° C.$^{-1}$ or more and 0.080° C.$^{-1}$ or less.

In the present invention and the present specification, the vertical switching field distribution SFD of the magnetic recording medium is a switching field distribution measured in the vertical direction of the magnetic recording medium. The term "vertical direction" described regarding the switching field distribution refers to a direction orthogonal to the magnetic layer surface, and can also be referred to as a thickness direction. The "magnetic layer surface (surface of the magnetic layer)" has the same meaning as a surface of the magnetic recording medium on a magnetic layer side. In the present invention and the present specification, the vertical switching field distribution SFD of the magnetic recording medium is a value obtained by the following method using a vibrating sample magnetometer.

A sample piece for measurement is cut out from the magnetic recording medium to be measured. A size of the sample piece need only be any size appropriate for being introduced into a vibrating sample magnetometer used for the measurement. For such a sample piece, using a vibrating sample magnetometer, a magnetic field is applied in the vertical direction (direction orthogonal to the magnetic layer surface) of the sample piece at a maximum applied magnetic field of 3979 kA/m, each measurement temperature, and a magnetic field sweeping speed of 8.3 kA/m/sec, and the magnetization strength of the sample piece at the maximum applied magnetic field is measured. The measured value is obtained as a value obtained by subtracting magnetization of a sample probe of a vibrating sample magnetometer as background noise. In a magnetic field-magnetization curve (referred to as an "M-H curve") obtained by such measurement, a magnitude H of a magnetic field at which the magnetization strength M is zero is defined as a coercivity Hc (unit: Oe). In addition, a half-width of a peak in a magnetic field higher than 2,000 Oe among peaks seen in a differential curve in a case where the magnetization is differentiated by a magnetic field is defined as an HPW (unit: Oe). "HPW" is an abbreviation for half peak width. SFD is obtained by SFD=HPW Hc. Regarding the unit, 1 Oe (1 oersted)=79.6 A/m. The measurement temperature is a temperature of the sample piece. By setting an atmosphere temperature around the sample piece to each measurement temperature (10° C., 25° C., and 40° C.), the temperature of the sample piece can be set to each measurement temperature by establishing a temperature equilibrium. The measurement may be executed in any order regardless of the order in which the measurements at the above three measurement temperatures (10° C., 25° C., and 40° C.) are executed.

The above-mentioned "inclination of SFD" is obtained as a rate of change of SFD with respect to the measurement temperature, which is calculated by linearly approximating a relationship between the measurement temperature and SFD for the above three measurement temperatures by a least square method.

As a result of intensive studies, the present inventor has newly found that, for a magnetic recording medium including a magnetic layer containing an ε-iron oxide powder, by setting SFD at the measurement temperature of 25° C. and the inclination of SFD to the above ranges, respectively, deterioration in electromagnetic conversion characteristics in use under different temperature conditions can be suppressed.

Hereinafter, the magnetic recording medium will be further described in detail.

<SFD at Measurement Temperature of 25° C.>

The SFD of the magnetic recording medium at a measurement temperature of 25° C. is 0.20 or more and 3.00 or less. From the viewpoint of further suppressing deterioration in electromagnetic conversion characteristics in use under different temperature conditions, the SFD at the measurement temperature of 25° C. is preferably 0.50 or more, more preferably 0.80 or more, and still more preferably 1.00 or more. From the same viewpoint, the SFD at the measurement temperature of 25° C. is preferably 2.50 or less, more preferably 2.00 or less, and still more preferably 1.80 or less. The SFD at the measurement temperature of 25° C. can be controlled, for example, by composition and/or an average particle size of the ε-iron oxide powder used for forming the magnetic layer. Details will be described below.

<Inclination of SFD>

The inclination of SFD of the magnetic recording medium is 0.003° C.$^{-1}$ or more and 0.080° C.$^{-1}$ or less. From the viewpoint of further suppressing deterioration in electromagnetic conversion characteristics in use under different temperature conditions, the inclination of SFD is preferably 0.005° C.$^{-1}$ or more, more preferably 0.008° C.$^{-1}$ or more, still more preferably 0.010° C.$^{-1}$ or more, and still more preferably 0.030° C.$^{-1}$ or more. From the same viewpoint, the inclination of SFD is preferably 0.070° C.$^{-1}$ or less, more preferably 0.060° C.$^{-1}$ or less, and still more preferably 0.050° C.' or less. The inclination of SFD can be controlled, for example, by manufacturing conditions of the ε-iron oxide powder used for forming the magnetic layer and/or composition of the ε-iron oxide powder. Details will be described below.

<Magnetic Layer>

<<ε-Iron Oxide Powder>>

The magnetic recording medium contains an ε-iron oxide powder as a ferromagnetic powder in a magnetic layer. In the present invention and the present specification, the term "ε-iron oxide powder" refers to a ferromagnetic powder in which an ε-iron oxide type crystal structure (ε phase) is detected as a main phase by X-ray diffraction analysis. For example, in a case where the highest intensity diffraction peak is attributed to an ε-iron oxide type crystal structure (ε phase) in an X-ray diffraction spectrum obtained by X-ray diffraction analysis, it is determined that the ε-iron oxide type crystal structure is detected as the main phase. In addition to the ε phase of the main phase, an α phase and/or a γ phase may or may not be included. An ε-iron oxide powder in the present invention and the present specification includes a so-called non-substitution type ε-iron oxide powder composed of iron and oxygen, and a so-called substitution type ε-iron oxide powder including one or more substituent elements substituting for iron.

(Method of Manufacturing ε-Iron Oxide Powder)

As a method of manufacturing an ε-iron oxide powder, a producing method from a goethite, a reverse micelle method, and the like are known. All of the manufacturing methods are well known. Regarding a method of manufacturing an ε-iron oxide powder in which a part of iron is substituted with substituent elements, a description disclosed in J. Jpn. Soc. Powder Metallurgy Vol. 61 Supplement, No. 51, pp. 5280 to 5284, J. Mater. Chem. C, 2013, 1, pp. 5200 to 5206 can be referred to, for example.

As an example, an ε-iron oxide powder contained in a magnetic layer of the magnetic recording medium can be obtained, for example, by a manufacturing method of obtaining an ε-iron oxide powder by preparing a precursor of ε-iron oxide (hereinafter, referred to as a "precursor preparation step"), subjecting the precursor to a coat-forming treatment (hereinafter, referred to as a "coat-forming step"), subjecting the precursor having undergone the coat-forming treatment to a heat treatment, thereby converting the precursor to ε-iron oxide (hereinafter, referred to as a "heat treatment step"), and subjecting the ε-iron oxide to a coat-removing treatment (hereinafter, referred to as a "coat-removing step"). The manufacturing method will be further described below. However, the manufacturing method described below is merely an example, and the ε-iron oxide powder is not limited to those manufactured by the manufacturing method exemplified below.

Precursor Preparation Step

A precursor of ε-iron oxide refers to a substance that includes an ε-iron oxide type crystal structure as a main phase by being heated. The precursor can be, for example, a hydroxide, an oxyhydroxide (oxide hydroxide), or the like containing iron and an element capable of substituting for a part of iron in a crystal structure. The precursor preparation step can be performed by using a coprecipitation method, a reverse micelle method, or the like. A method of preparing such a precursor is well known, and the precursor preparation step in the above-described manufacturing method can be performed by a well-known method. For example, for the method of preparing the precursor, a well-known technology such as paragraphs 0017 to 0021 of JP2008-174405A and examples thereof, paragraphs 0025 to 0046 of WO2016/047559A1 and examples thereof, paragraphs 0038 to 0040, 0042, 0044, and 0045 of WO2008/149785A1 and examples thereof can be referred to.

ε-Iron oxide, which does not include a substituent element substituting for a part of iron (Fe), can be represented by a composition formula of $Fe_2O_3$. On the other hand, ε-iron oxide in which a part of iron is substituted with, for example, one or more types of elements can be represented by a composition formula of $A^1_x A^2_y A^3_z Fe_{(2-x-y-z)}O_3$. $A^1$, $A^2$, and $A^3$ each independently represent one or more types of substituent elements substituting for iron, and x, y, and z are each independently 0 or more and less than 2, where at least one is more than 0 and x+y+z is less than 2. The ε-iron oxide powder may or may not include a substituent element substituting for iron, and preferably includes a substituent element. A type of a substituent element can be one or more types, and can be one type to three types, one type to five types, or one type to six types. Magnetic properties of an ε-iron oxide powder can be adjusted by a type and a substitution amount of a substituent element. Adjusting the magnetic properties of the ε-iron oxide powder in this way can contribute to controlling the SFD of the magnetic recording medium having the magnetic layer containing such an ε-iron oxide powder at the measurement temperature of 25° C. and value of the inclination of SFD within the above-described range. In a case where a substituent element is contained, the substituent element may include one or more of Ga, Al, In, Rh, Mn, Co, Ni, Zn, Ti, Sn, and the like. For example, in the above composition formula, $A^1$ may be one or more selected from the group consisting of Ga, Al, In, and Rh, and $A^2$ may be one or more selected from the group consisting of Co, Mn, Ni, and Zn, and $A^3$ may be one or more selected from the group consisting of Ti and Sn. The ε-iron oxide powder preferably contains a cobalt element (Co), more preferably contains one or more selected from the group consisting of a cobalt element, a gallium element (Ga), an aluminum element (Al), an indium element (In), and a rhodium element (Rh) and one or more selected from the group consisting of a titanium element (Ti) and a tin element (Sn), and still more preferably contains a cobalt element, a gallium element and/or an aluminum element, and a titanium element and/or a tin element. In a case where an ε-iron oxide powder containing a substituent element substituting for iron is manufactured, a part of a compound serving as a supply source of iron in ε-iron oxide need only be substituted with a compound of the substituent element. The composition of an ε-iron oxide powder obtained can be controlled by the substitution amount of the compound. Examples of the compound serving as a supply source of iron and various substituent elements include an inorganic salt (which may be a hydrate) such as a nitrate, a sulfate, and a chloride, an organic salt (which may be a hydrate) such as a pentakis (hydrogen oxalate) salt, a hydroxide, an oxyhydroxide, and the like.

Coat-Forming Step

In a case where the precursor is heated after the coat-forming treatment, reaction can proceed by which the precursor is converted to ε-iron oxide under the coat. It is considered that the coat can play a role of preventing sintering from occurring during heating. From the viewpoint of ease of forming the coat, the coat-forming treatment is preferably performed in a solution, and more preferably performed by adding a coat-forming agent (compound for forming a coat) to a solution including the precursor. For example, in a case where the coat-forming treatment is performed in the same solution after the preparation of the precursor, by adding the coat-forming agent to the solution after the preparation of the precursor and stirring the solution, a coat can be formed on the precursor. As the coat, for example, a silicon-containing coat is preferable because the coat is easily formed on the precursor in the solution. Examples of the coat-forming agent for forming the silicon-containing coat include a silane compound such as alkoxysilane. Through hydrolysis of the silane compound, a silicon-containing coat can be formed on the precursor, preferably using a sol-gel method. Specific examples of the silane compound include tetraethoxysilane (tetraethyl orthosilicate; TEOS), tetramethoxysilane, and various silane coupling agents. For the coat-forming treatment, for example, a well-known technology such as a paragraph 0022 of JP2008-174405A and examples thereof, paragraphs 0047 to 0049 of WO2016/047559A1 and examples thereof, paragraphs 0041 and 0043 of WO2008/149785A1 and examples thereof can be referred to. For example, the coat-forming treatment can be performed by stirring a solution including a precursor and a coat-forming agent at a liquid temperature of 50° C. to 90° C. The stirring time can be, for example, 5 to 36 hours (total stirring time in a case of performing the dividing addition described below). The coat may cover the entire surface of the precursor, or a part of the surface of the precursor may not be covered with the coat.

Heat Treatment Step

By performing a heat treatment on the precursor having undergone the coat-forming treatment, the precursor can be converted to ε-iron oxide. The heat treatment can be performed on, for example, a powder (powder of the precursor having the coat) collected from the solution in which the coat-forming treatment is performed. For the heat treatment step, for example, a well-known technology such as a paragraph 0023 of JP2008-174405A and examples thereof, a paragraph 0050 of WO2016/047559A1 and examples thereof, paragraphs 0041 and 0043 of WO2008/149785A1 and examples thereof can be referred to. The higher the temperature of the heat treatment step and/or the longer the heat treatment time, the larger the particle size of the ε-iron oxide powder obtained tends to be. In addition, adjusting the treatment conditions in the heat treatment step can contribute to controlling the value of the inclination of SFD. From the viewpoint of controlling the inclination of SFD within the above range, it is preferable that the temperature is lowered in two or more stages after the temperature is raised in the heat treatment step. As a more preferable heat treatment step, the following heat treatment step can be used. First, the temperature is raised by setting a reaching temperature to a temperature in a range of 900° C. to 1200° C. A rate of temperature rise is preferably in a range of 3 to 15° C./min. After the temperature rise, the temperature is maintained at the reaching temperature. The maintenance time is preferably 0.5 to 5 minutes. After that, the temperature is lowered to a reaching temperature in a range of 900° C. to 1200° C. (where, lower than the reaching temperature of the temperature rise) with a reaching time of 0.5 to 2.0 hours. The reaching time is a time required to reach the reaching temperature. After the temperature is lowered to the reaching temperature, the temperature is lowered to an reaching temperature in a range of 900° C. to 1200° C. (where, lower than the reaching temperature of the temperature drop) with a reaching time of 2.0 to 3.0 hours. The temperature described for the heat treatment step can be, for example, an in-furnace temperature of a heating furnace in which the heat treatment is performed. The present inventor considers that performing the heat treatment step as described above contributes to controlling distribution of the particle size of the particles constituting the ε-iron oxide powder within an appropriate range. It is speculated that reducing the distribution of the particle size leads to reducing the value of the inclination of SFD. In addition, the present inventor considers that the fact that the ε-iron oxide powder has an appropriate particle size distribution contributes to making the inclination of SFD equal to or more than $0.003°$ $C.^{-1}$. Specifically, it is speculated that the irregularities on the magnetic layer surface can be filled with the extremely small particles in the case where the extremely small particles are appropriately present, and as a result, the occurrence of the spacing loss which causes deterioration in electromagnetic conversion characteristics can be suppressed. The present inventor speculates that this may be the reason why controlling the value of the inclination of SFD to $0.003°$ $C.^{-1}$ or more can contribute to suppressing deterioration in electromagnetic conversion characteristics in use under different temperature conditions. Note that the present invention is not limited to the speculation of the present inventor described in the present specification, such as speculation.

Coat-Removing Step

By performing the heat treatment step, the precursor having the coat can be converted to ε-iron oxide. Since the coat remains on the ε-iron oxide thus obtained, a coat-removing treatment is preferably performed. For the coat-removing treatment, for example, a well-known technology such as a paragraph 0025 of JP2008-174405A and examples thereof, a paragraph 0053 of WO2008/149785A1 and examples thereof can be referred to. The coat-removing treatment can be performed, for example, by stirring ε-iron oxide having the coat in a sodium hydroxide aqueous solution having a concentration of about 1 to 5 mol/L and a liquid temperature of about 60° C. to 90° C. for about 5 to 36 hours. Here, the ε-iron oxide powder contained in the magnetic layer of the magnetic recording medium may be manufactured without performing the coat-removing treatment, or may be such that the coat is not completely removed by the coat-removing treatment and a part of the coat remains.

A well-known step can be optionally executed before and/or after the various steps described above. Examples of such a step include various well-known steps such as classification, filtration, washing, and drying.

(Average Particle Size)

From the viewpoint of the magnetization stability, an average particle size of the ε-iron oxide powder contained in the magnetic layer of the magnetic recording medium is preferably 5.0 nm or more, more preferably 6.0 nm or more, still more preferably 7.0 nm or more, still more preferably 8.0 nm or more, and still more preferably 9.0 nm or more. In addition, from the viewpoint of realization of high-density recording, the average particle size of the ε-iron oxide powder is preferably 20.0 nm or less, more preferably 19.0 nm or less, still more preferably 18.0 nm or less, still more preferably 17.0 nm or less, still more preferably 16.0 nm or less, and still more preferably 15.0 nm or less. A magnetic recording medium containing an ε-iron oxide powder having a smaller average particle size tends to have a large value of SFD.

In the present invention and the present specification, unless otherwise noted, an average particle size of various powders such as an ε-iron oxide powder is a value measured by the following method using a transmission electron microscope.

The powder is imaged at an imaging magnification of 100,000× with a transmission electron microscope, and the image is printed on photographic printing paper or displayed on a display so that the total magnification is 500,000×, to obtain an image of particles configuring the powder. A target particle is selected from the obtained image of particles, an outline of the particle is traced by a digitizer, and a size of the particle (primary particle) is measured. The primary particles are independent particles without aggregation.

The measurement described above is performed regarding 500 particles randomly extracted. An arithmetic average of the particle sizes of 500 particles thus obtained is an average particle size of the powder.

As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss. An average particle size shown in Examples which will be described below is a value measured by using a transmission electron microscope H-9000 manufactured by Hitachi, Ltd. as the transmission electron microscope, and image analysis software KS-400 manufactured by Carl Zeiss as the image analysis software. In the present invention and the present specification, the powder means aggregation of a plurality of particles. For example, ferromagnetic powder means aggregation of a plurality of ferromagnetic particles. Further, the aggregation of the plurality of particles not only includes an aspect in which particles constituting the aggregate directly come into contact with each other, but also includes an aspect in which a binding agent or an additive which will be described below is interposed between the particles. The term "particle" is used to describe a powder in some cases.

As a method of collecting sample powder from the magnetic recording medium in order to measure the particle size, a method disclosed in a paragraph 0015 of JP2011-048878A can be adopted, for example.

In the present invention and the present specification, unless otherwise noted, (1) in a case where the shape of the particle observed in the particle photograph described above is a needle shape, a fusiform shape, or a columnar shape (here, a height is greater than a maximum long diameter of a bottom surface), the size (particle size) of the particles configuring the powder is shown as a length of a long axis configuring the particle, that is, a long axis length, (2) in a case where the shape of the particle is a plate shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an amorphous shape, and the long axis configuring the particles cannot be specified from the shape, the particle size is shown as an equivalent circle diameter. The equivalent circle diameter refers to a value obtained by a circle projection method.

In addition, regarding an average acicular ratio of the powder, a length of a short axis, that is, a short axis length of the particles is measured in the measurement described above, a value of (long axis length/short axis length) of each particle is obtained, and an arithmetic average of the values obtained regarding 500 particles is calculated. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, unless otherwise noted, in a case where the shape of the particle is specified, for example, in a case of definition of the particle size (1), the average particle size is an average long axis length, and in a case of the definition (2), the average particle size is an average plate diameter. In a case of the definition (3), the average particle size is an average diameter (also referred to as an average particle diameter).

The content (filling ratio) of the ferromagnetic powder of the magnetic layer is preferably 50 to 90 mass % and more preferably 60 to 90 mass %. A high filling ratio of the ferromagnetic powder in the magnetic layer is preferable from the viewpoint of improvement of the recording density.

<<Binding Agent>>

The magnetic recording medium can be a coating type magnetic recording medium, and can include a binding agent in the magnetic layer. The binding agent is one or more resins. As the binding agent, various resins usually used as a binding agent of a coating type magnetic recording medium can be used. For example, as the binding agent, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkyal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins may be homopolymers or copolymers. These resins can be used as the binding agent even in a non-magnetic layer and/or a back coating layer which will be described below.

For the binding agent described above, descriptions disclosed in paragraphs 0028 to 0031 of JP2010-24113A can be referred to. In addition, the binding agent may be a radiation curable resin such as an electron beam curable resin. For the radiation curable resin, descriptions disclosed in paragraphs 0044 and 0045 of JP2011-048878A can be referred to. An average molecular weight of the resin used as the binding agent can be, for example, 10,000 to 200,000 as a weight-average molecular weight. The weight-average molecular weight of the present invention and the present specification is a value obtained by performing polystyrene conversion of a value measured by gel permeation chromatography (GPC) under the following measurement conditions. The weight-average molecular weight of the binding agent shown in Examples described below is a value obtained by performing polystyrene conversion of a value measured under the following measurement conditions. The binding agent may be used in an amount of, for example, 1.0 to 30.0 parts by mass with respect to 100.0 parts by mass of the ferromagnetic powder.

GPC device: HLC-8120 (manufactured by Tosoh Corporation)

Column: TSK gel Multipore HXL-M (manufactured by Tosoh Corporation, 7.8 mm inner diameter (ID)×30.0 cm)

Eluent: Tetrahydrofuran (THF)

A curing agent can also be used together with the resin which can be used as the binding agent. As the curing agent, in one aspect, a thermosetting compound which is a compound in which curing reaction (crosslinking reaction) proceeds due to heating can be used, and in another aspect, a photocurable compound in which a curing reaction (crosslinking reaction) proceeds due to light irradiation can be used. At least a part of the curing agent is contained in the magnetic layer in a state of being reacted (crosslinked) with other components such as the binding agent, by proceeding the curing reaction in the magnetic layer forming step. The same applies to the layer formed using this composition in a case where the composition used to form the other layer includes a curing agent. The preferred curing agent is a thermosetting compound, polyisocyanate is suitable. For details of the polyisocyanate, descriptions disclosed in paragraphs 0124 and 0125 of JP2011-216149A can be referred to. The curing agent can be used in the magnetic layer forming composition in an amount of, for example, 0 to 80.0 parts by mass, and preferably 10.0 to 80.0 parts by mass, and more preferably 50.0 to 80.0 parts by mass from the viewpoint of improving the strength of the magnetic layer, with respect to 100.0 parts by mass of the binding agent.

The above description regarding the binding agent and the curing agent can also be applied to a non-magnetic layer and/or a back coating layer. In this case, the above description regarding the content can be applied by replacing the ferromagnetic powder with non-magnetic powder.

<<Additive>>

The magnetic layer may include one or more additives as necessary in addition to the above-described various components. As the additive, a commercially available product can be appropriately selected and used according to a desired property. Alternatively, a compound synthesized by a well-known method can be used as the additive. Examples of the additive include the curing agent described above. In addition, examples of the additive which can be contained in the magnetic layer include a non-magnetic powder, a lubricant, a dispersing agent, a dispersing assistant, an antibacterial agent, an antistatic agent, an antioxidant, carbon black, and the like. As the additive, a commercially available product can be appropriately selected and used according to a desired property. For example, for the lubricant, descriptions disclosed in paragraphs 0030 to 0033, 0035, and 0036 of JP2016-126817A can be referred to. The non-magnetic layer may contain a lubricant. For the lubricant which may be included in the non-magnetic layer, descriptions disclosed in paragraphs 0030, 0031, 0034, 0035, and 0036 of JP2016-126817A can be referred to. For the dispersing agent, descriptions disclosed in paragraphs 0061 and 0071 of JP2012-133837A can be referred to. The dispersing agent may be contained in the non-magnetic layer. For the dispersing agent which may be contained in the non-magnetic layer, a description disclosed in a paragraph 0061 of JP2012-133837A can be referred to.

Regarding the additive, the magnetic layer preferably contains one or more kinds of non-magnetic powders. Examples of the non-magnetic powder include a non-magnetic powder that can function as a protrusion forming agent for forming protrusions that protrude appropriately on the magnetic layer surface (hereinafter, referred to as a "protrusion forming agent"). As the protrusion forming agent, a particle of an inorganic substance can be used, a particle of an organic substance can be used, and a composite particle of an inorganic substance and an organic substance can also be used. Examples of the inorganic substance include an inorganic oxide such as metal oxide, metal carbonate, metal sulfate, metal nitride, metal carbide, and metal sulfide, and an inorganic oxide is preferable. In one aspect, the protrusion forming agent may be an inorganic oxide-based particle. Here, the term "-based" is used to mean "including". An aspect of the inorganic oxide-based particle is a particle made of an inorganic oxide. Another aspect of the inorganic oxide-based particle is a composite particle of an inorganic oxide and an organic substance, and specific examples thereof include a composite particle of an inorganic oxide and a polymer. Examples of such particle include a particle having a polymer bonded to a surface of an inorganic oxide particle. An average particle size of the protrusion forming agent may be, for example, 30 to 300 nm, and is preferably 40 to 200 nm.

Examples of the non-magnetic powder contained in the magnetic layer include a non-magnetic powder that can function as an abrasive (hereinafter, referred to as an "abrasive"). The abrasive is preferably a non-magnetic powder having a Mohs hardness of more than 8, and more preferably a non-magnetic powder having a Mohs hardness of 9 or more. On the other hand, a Mohs hardness of the protrusion forming agent may be, for example, 8 or less or 7 or less. The maximum value of a Mohs hardness is 10 for diamond. Specifically, powders of alumina (for example, $Al_2O_3$), silicon carbide, boron carbide (for example, $B_4C$), $SiO_2$, TiC, chromium oxide (for example, $Cr_2O_3$), cerium oxide, zirconium oxide (for example, $ZrO_2$), non-magnetic iron oxide, diamond, and the like can be used, and among these, alumina powder such as α-alumina and silicon carbide powder are preferable. In addition, the average particle size of the abrasive may be, for example, in a range of 30 to 300 nm, and preferably in a range of 50 to 200 nm.

From the viewpoint that the protrusion forming agent and the abrasive can exhibit their functions more satisfactorily, a content of the protrusion forming agent in the magnetic layer is preferably 1.0 to 4.0 parts by mass, and more preferably 1.2 to 3.5 parts by mass with respect to 100.0 parts by mass of the ferromagnetic powder. On the other hand, a content of the abrasive in the magnetic layer is preferably 1.0 to 20.0 parts by mass, more preferably 3.0 to 15.0 parts by mass, and still more preferably 4.0 to 10.0 parts by mass with respect to 100.0 parts by mass of the ferromagnetic powder.

As an example of the additive that may be used in the magnetic layer including the abrasive, a dispersing agent disclosed in paragraphs 0012 to 0022 of JP2013-131285A can be used as a dispersing agent for improving dispersibility of the abrasive in the magnetic layer forming composition. For the dispersing agent, descriptions disclosed in paragraphs 0061 and 0071 of JP2012-133837A can be referred to. The dispersing agent may be contained in the non-magnetic layer. For the dispersing agent which may be contained in the non-magnetic layer, a description disclosed in a paragraph 0061 of JP2012-133837A can be referred to.

The magnetic layer described above can be provided on a surface of the non-magnetic support directly or indirectly through the non-magnetic layer.

<Non-Magnetic Layer>

The non-magnetic powder used for the non-magnetic layer may be an inorganic substance powder or an organic substance powder. In addition, carbon black and the like can be used. Examples of the inorganic substance include metal, metal oxide, metal carbonate, metal sulfate, metal nitride, metal carbide, and metal sulfide. These non-magnetic powders can be purchased as a commercially available product or can be manufactured by a well-known method. For details thereof, descriptions disclosed in paragraphs 0146 to 0150 of JP2011-216149A can be referred to. For carbon black which can be used in the non-magnetic layer, descriptions disclosed in paragraphs 0040 and 0041 of JP2010-24113A can be referred to. The content (filling ratio) of the non-magnetic powder of the non-magnetic layer is preferably 50 to 90 mass % and more preferably 60 to 90 mass %.

The non-magnetic layer can include a binding agent, and can also include an additive. For other details of the binding agent or the additive of the non-magnetic layer, a well-known technology regarding the non-magnetic layer can be applied. In addition, in regards to the type and the content of the binding agent, and the type and the content of the additive, for example, a well-known technology regarding the magnetic layer can be applied.

The non-magnetic layer of the present invention and the present specification also includes a substantially non-magnetic layer containing a small amount of ferromagnetic powder as impurities or intentionally, together with the non-magnetic powder. Here, the substantially non-magnetic layer is a layer having a residual magnetic flux density equal to or smaller than 10 mT, a layer having a coercivity equal to or smaller than 7.96 kA/m (100 Oe), or a layer having a residual magnetic flux density equal to or smaller than 10 mT and a coercivity equal to or smaller than 7.96 kA/m (100 Oe). It is preferable that the non-magnetic layer does not have a residual magnetic flux density and a coercivity.

<Non-Magnetic Support>

Next, the non-magnetic support will be described. Examples of the non-magnetic support (hereinafter, simply referred to as a "support") include well-known components such as polyethylene terephthalate, polyethylene naphthalate, polyamide such as aromatic polyamide, and polyamideimide subjected to biaxial stretching. Among these, polyethylene terephthalate, polyethylene naphthalate, and polyamide are preferable. A corona discharge, a plasma treatment, an easy-bonding treatment, or a heat treatment may be performed on these supports in advance.

<Back Coating Layer>

In one aspect, the magnetic recording medium may further include a back coating layer containing a non-magnetic powder on a surface side of the non-magnetic support opposite to a surface side on which the magnetic layer is provided, and in another aspect, the magnetic recording medium may not include a back coating layer. The back coating layer preferably contains any one or both of carbon black and an inorganic powder. The back coating layer can include a binding agent and can also include additives. In regards to the binding agent and the additive of the back coating layer, a well-known technology regarding the back coating layer can be applied, and a well-known technology regarding the formulation of components of the magnetic layer and/or the non-magnetic layer can be applied. For example, for the back coating layer, descriptions disclosed in paragraphs 0018 to 0020 of JP2006-331625A and column 4, line 65 to column 5, line 38 of U.S. Pat. No. 7,029,774B can be referred to.

<Various Thicknesses>

A thickness of the non-magnetic support is preferably 3.0 to 6.0 μm.

A thickness of the magnetic layer is preferably 0.15 μm or less, and more preferably 0.1 μm or less, from the viewpoint of high-density recording required in recent years. The thickness of the magnetic layer is still more preferably in a range of 0.01 to 0.1 μm. The magnetic layer need only be at least a single layer, the magnetic layer may be separated into two or more layers having different magnetic properties, and a configuration of a well-known multilayered magnetic layer can be applied as the magnetic layer. The thickness of the magnetic layer in a case where the magnetic layer is separated into two or more layers is a total thickness of the layers.

A thickness of the non-magnetic layer is, for example, 0.1 to 1.5 μm, and preferably 0.1 to 1.0 μm.

A thickness of the back coating layer is preferably 0.9 μm or less and more preferably 0.1 to 0.7 μm.

Thicknesses of each layer and the non-magnetic support of the magnetic recording medium can be obtained by a well-known film thickness measurement method. As an example, a cross section of the magnetic recording medium in a thickness direction is exposed by a well-known method of ion beams or microtome, and the exposed cross section is observed with a transmission electron microscope or a scanning electron microscope. In the cross section observation, various thicknesses can be obtained as a thickness obtained at one portion of the cross section, or an arithmetic average of thicknesses obtained at a plurality of portions of two or more portions which are randomly extracted. Alternatively, the thickness of each layer may be obtained as a designed thickness calculated under the manufacturing conditions.

<Manufacturing Step>

A step of preparing a composition for forming the magnetic layer, the non-magnetic layer, or the back coating layer can usually include at least a kneading step, a dispersing step, and, as necessary, a mixing step provided before and after these steps. Each step may be divided into two or more stages. Components used for the preparation of each layer forming composition may be added at an initial stage or in a middle stage of each step. As a solvent, one or more kinds of various solvents usually used for manufacturing a coating type magnetic recording medium can be used. For the solvent, for example, a description disclosed in a paragraph 0153 of JP2011-216149A can be referred to. In addition, each component can be separately added in two or more steps. In order to manufacture the above magnetic recording medium, a well-known manufacturing technology in the related art can be used in various steps. In the kneading step, an open kneader, a continuous kneader, a pressure kneader, or a kneader having a strong kneading force such as an extruder is preferably used. For details of these kneading processes, JP1989-106338A (JP-H01-106338A) and JP1989-79274A (JP-H01-79274A) can be referred to. As a dispersing device, a well-known dispersing device can be used. Each layer forming composition may be filtered by a well-known method before performing the coating step. The filtering can be performed by using a filter, for example. As the filter used in the filtering, a filter having a pore diameter of 0.01 to 3 μm (for example, filter made of glass fiber or filter made of polypropylene) can be used, for example.

In one aspect, in a step of preparing the magnetic layer forming composition, after a dispersion liquid including a protrusion forming agent (hereinafter, referred to as a "protrusion forming agent liquid") is prepared, the protrusion forming agent liquid can be mixed with one or more other components of the magnetic layer forming composition. For example, the magnetic layer forming composition can be prepared by separately preparing a protrusion forming agent liquid, a dispersion liquid including an abrasive (hereinafter, referred to as an "abrasive liquid"), and a dispersion liquid including ferromagnetic powder (hereinafter, referred to as a "magnetic liquid") and then mixing and dispersing them. It is preferable to prepare various dispersion liquids separately in this way in order to improve dispersibility of the ferromagnetic powder, the protrusion forming agent, and the abrasive in the magnetic layer forming composition. For example, the protrusion forming agent liquid can be prepared by a well-known dispersion treatment such as an ultrasonic treatment. The ultrasonic treatment can be performed for about 1 to 300 minutes at an ultrasonic output of about 10 to 2,000 watts per 200 cc (1 cc=1 cm$^3$), for example. In addition, the filtering may be performed after the dispersion treatment. For the filter used for the filtering, the above description can be referred to.

The magnetic layer can be formed by directly applying the magnetic layer forming composition onto the non-magnetic support or performing multilayer coating of the magnetic layer forming composition with the non-magnetic layer forming composition in order or at the same time. For details of the coating for forming each layer, a description disclosed in a paragraph 0066 of JP2010-231843A can be referred to.

After the coating step, various treatments such as a drying treatment, an alignment treatment of the magnetic layer, and a surface smoothing treatment (calendering treatment) can be performed. For various treatments, for example, a well-known technology disclosed in paragraphs 0052 to 0057 of JP2010-24113A can be referred to. For example, the coating layer of the magnetic layer forming composition can be subjected to an alignment treatment, while the coating layer is wet. For the alignment treatment, various well-known technologies including a description disclosed in a paragraph 0067 of JP2010-231843A can be used. For example, a vertical alignment treatment can be performed by a well-known method such as a method using a polar opposing magnet. In an alignment zone, a drying speed of the coating layer can be controlled depending on a temperature, an air volume of drying air and/or a transportation speed of the non-magnetic support on which the coating layer is formed in the alignment zone. In addition, the coating layer may be preliminarily dried before the transportation to the alignment zone.

The magnetic recording medium according to one aspect of the present invention may be a tape-shaped magnetic recording medium (magnetic tape) or a disk-shaped magnetic recording medium (magnetic disk). For example, the magnetic tape is usually accommodated in a magnetic tape cartridge and the magnetic tape cartridge is mounted on a magnetic recording and reproducing device. A servo pattern can also be formed on the magnetic recording medium by a well-known method in order to enable head tracking in the magnetic recording and reproducing device. The term "formation of servo pattern" can also be referred to as "recording of servo signal". Hereinafter, the formation of the servo patterns will be described using a magnetic tape as an example.

The servo pattern is usually formed along the longitudinal direction of the magnetic tape. Examples of control (servo control) systems using a servo signal include a timing-based servo (TBS), an amplitude servo, and a frequency servo.

As shown in European Computer Manufacturers Association (ECMA)-319 (June 2001), a timing-based servo system is adopted in a magnetic tape based on a linear tape-open (LTO) standard (generally referred to as an "LTO tape"). In this timing-based servo system, the servo pattern is formed by continuously disposing a plurality of pairs of non-parallel magnetic stripes (also referred to as "servo stripes") in the longitudinal direction of the magnetic tape. As described above, the reason why the servo pattern is formed of a pair of non-parallel magnetic stripes is to indicate, to a servo signal reading element passing over the servo pattern, a passing position thereof. Specifically, the pair of magnetic stripes is formed such that an interval thereof continuously changes along a width direction of the magnetic tape, and the servo signal reading element reads the interval to thereby sense a relative position between the servo pattern and the servo signal reading element. Information on this relative position enables tracking on a data track. Accordingly, a plurality of servo tracks are usually set on the servo pattern along the width direction of the magnetic tape.

A servo band is formed of a servo signal continuous in the longitudinal direction of the magnetic tape. A plurality of the servo bands are usually provided on the magnetic tape. For example, in an LTO tape, the number of the servo bands is five. A region interposed between two adjacent servo bands is referred to as a data band. The data band is formed of a plurality of data tracks and each data track corresponds to each servo track.

Further, in one aspect, as shown in JP2004-318983A, information indicating a servo band number (referred to as "servo band identification (ID)" or "unique data band identification method (UDIM) information") is embedded in each servo band. This servo band ID is recorded by shifting a specific one of the plurality of pairs of the servo stripes in the servo band so that positions thereof are relatively displaced in the longitudinal direction of the magnetic tape. Specifically, a way of shifting the specific one of the plurality of pairs of servo stripes is changed for each servo band. Accordingly, the recorded servo band ID is unique for each servo band, and thus, the servo band can be uniquely specified only by reading one servo band with a servo signal reading element.

As a method for uniquely specifying the servo band, there is a method using a staggered method as shown in ECMA-319 (June 2001). In this staggered method, a group of pairs of non-parallel magnetic stripes (servo stripes) disposed continuously in plural in a longitudinal direction of the magnetic tape is recorded so as to be shifted in a longitudinal direction of the magnetic tape for each servo band. Since this combination of shifting methods between adjacent servo bands is unique throughout the magnetic tape, it is possible to uniquely specify a servo band in a case of reading a servo pattern with two servo signal reading elements.

As shown in ECMA-319 (June 2001), information indicating a position of the magnetic tape in the longitudinal direction (also referred to as "longitudinal position (LPOS) information") is usually embedded in each servo band. This LPOS information is also recorded by shifting the positions of the pair of servo stripes in the longitudinal direction of the magnetic tape, as the UDIM information. Note that, unlike the UDIM information, in this LPOS information, the same signal is recorded in each servo band.

It is also possible to embed, in the servo band, the other information different from the above UDIM information and LPOS information. In this case, the embedded information may be different for each servo band as the UDIM information or may be common to all servo bands as the LPOS information.

As a method of embedding the information in the servo band, a method other than the method described above can be used. For example, a predetermined code may be recorded by thinning out a predetermined pair from the group of pairs of servo stripes.

A head for forming a servo pattern is called a servo write head. The servo write head has a pair of gaps corresponding to the pair of magnetic stripes as many as the number of servo bands. Usually, a core and a coil are connected to each pair of gaps, and by supplying a current pulse to the coil, a magnetic field generated in the core can cause generation of a leakage magnetic field in the pair of gaps. In a case of forming the servo pattern, by inputting a current pulse while running the magnetic tape on the servo write head, the magnetic pattern corresponding to the pair of gaps is transferred to the magnetic tape to form the servo pattern. A width of each gap can be appropriately set according to a density of the servo pattern to be formed. The width of each gap can be set to, for example, 1 µm or less, 1 to 10 µm, 10 µm or more, and the like.

Before the servo pattern is formed on the magnetic tape, the magnetic tape is usually subjected to a demagnetization (erasing) treatment. This erasing treatment can be performed by applying a uniform magnetic field to the magnetic tape using a direct current magnet or an alternating current magnet. The erasing treatment includes direct current (DC) erasing and alternating current (AC) erasing. The AC erasing is performed by gradually decreasing an intensity of the magnetic field while reversing a direction of the magnetic field applied to the magnetic tape. Meanwhile, the DC erasing is performed by applying a unidirectional magnetic field to the magnetic tape. The DC erasing further includes two methods. A first method is horizontal DC erasing of applying a unidirectional magnetic field along a longitudinal direction of the magnetic tape. A second method is vertical DC erasing of applying a unidirectional magnetic field along a thickness direction of the magnetic tape. The erasing treatment may be performed on the entire magnetic tape or may be performed for each servo band of the magnetic tape.

A direction of the magnetic field of the servo pattern to be formed is determined according to a direction of the erasing. For example, in a case where the horizontal DC erasing is performed to the magnetic tape, the servo pattern is formed so that the direction of the magnetic field is opposite to the direction of the erasing. Therefore, an output of a servo signal obtained by reading the servo pattern can be increased. As disclosed in JP2012-53940A, in a case where a magnetic pattern is transferred to, using the gap, a magnetic tape that has been subjected to vertical DC erasing, a servo signal obtained by reading the formed servo pattern has a monopolar pulse shape. Meanwhile, in a case where a magnetic pattern is transferred to, using the gap, a magnetic tape that has been subjected to horizontal DC erasing, a servo signal obtained by reading the formed servo pattern has a bipolar pulse shape.

The magnetic tape is usually accommodated in a magnetic tape cartridge and the magnetic tape cartridge is mounted in the magnetic recording and reproducing device.

[Magnetic Tape Cartridge]

Another aspect of the present invention relates to a magnetic tape cartridge including the aforementioned tape-shaped magnetic recording medium (that is, the magnetic tape).

Details of the magnetic tape included in the magnetic tape cartridge are as described above.

In the magnetic tape cartridge, generally, the magnetic tape is accommodated inside a cartridge body in a state of being wound around a reel. The reel is rotatably provided inside the cartridge body. As the magnetic tape cartridge, a single reel type magnetic tape cartridge having one reel inside the cartridge body and a dual reel type magnetic tape cartridge having two reels inside the cartridge body are widely used. In a case where the single reel type magnetic tape cartridge is mounted on a magnetic recording and reproducing device for recording and/or reproducing data on the magnetic tape, the magnetic tape is pulled out of the magnetic tape cartridge to be wound around the reel on the magnetic recording and reproducing device side. A magnetic head is disposed on a magnetic tape transportation path from the magnetic tape cartridge to a winding reel. Feeding and winding of the magnetic tape are performed between a reel (supply reel) on the magnetic tape cartridge side and a reel (winding reel) on the magnetic recording and reproducing device side. During this time, data is recorded and/or reproduced as the magnetic head and the surface of the magnetic tape on the magnetic layer side come into contact with each other to be slid on each other. With respect to this, in the dual reel type magnetic tape cartridge, both reels of the supply reel and the winding reel are provided in the magnetic tape cartridge. The magnetic tape cartridge may be any of single reel type magnetic tape cartridge and dual reel type magnetic tape cartridge. The above magnetic tape cartridge need only include the magnetic tape according to one aspect of the present invention, and a well-known technology can be applied to the others. The total length of the magnetic tape accommodated in the magnetic tape cartridge may be, for example, 800 m or more, and may be in a range of about 800 m to 2,000 m. It is preferable that the total length of the tape accommodated in the magnetic tape cartridge is long from the viewpoint of increasing the capacity of the magnetic tape cartridge.

[Magnetic Recording and Reproducing Device]

Still another aspect of the present invention relates to a magnetic recording and reproducing device comprising the magnetic recording medium.

In the present invention and the present specification, the term "magnetic recording and reproducing device" means a device capable of performing at least one of the recording of data on the magnetic recording medium or the reproducing of data recorded on the magnetic recording medium. Such a device is generally called a drive. The magnetic recording and reproducing device can be a sliding type magnetic recording and reproducing device. The sliding type magnetic recording and reproducing device is a device in which the surface on the magnetic layer side and the magnetic head come into contact with each other to be slid on each other, in a case of performing recording of data on the magnetic recording medium and/or reproducing of the recorded data. For example, the magnetic recording and reproducing device can attachably and detachably include the magnetic tape cartridge.

The magnetic recording and reproducing device may include a magnetic head. The magnetic head can be a recording head capable of performing the recording of data on the magnetic tape, or can be a reproducing head capable of performing the reproducing of data recorded on the magnetic tape. In addition, in one aspect, the magnetic recording and reproducing device can include both a recording head and a reproducing head as separate magnetic heads. In another aspect, the magnetic head included in the magnetic recording and reproducing device can have a configuration in which both an element for recording data (recording element) and an element for reproducing data (reproducing element) are included in one magnetic head. Hereinafter, the element for recording data and the element for reproducing are collectively referred to as "elements for data". As the reproducing head, a magnetic head (MR head) including a magnetoresistive (MR) element capable of sensitively reading data recorded on the magnetic tape as a reproducing element is preferable. As the MR head, various well-known MR heads such as an Anisotropic Magnetoresistive (AMR) head, a Giant Magnetoresistive (GMR) head, or a Tunnel Magnetoresistive (TMR) can be used. In addition, the magnetic head which performs the recording of data and/or the reproducing of data may include a servo signal reading element. Alternatively, as a head other than the magnetic head which performs the recording of data and/or the reproducing of data, a magnetic head (servo head) comprising a servo signal reading element may be included in the magnetic recording and reproducing device. For example, a magnetic head that records data and/or reproduces recorded data (hereinafter also referred to as "recording and reproducing head") can include two servo signal reading elements, and the two servo signal reading elements can simultaneously read two adjacent servo bands. One or a plurality of elements for data can be disposed between the two servo signal reading elements.

In the magnetic recording and reproducing device, recording of data on the magnetic recording medium and/or reproducing of data recorded on the magnetic recording medium can be performed as the surface of the magnetic recording medium on the magnetic layer side and the magnetic head come into contact with each other to be slid on each other. The magnetic recording and reproducing device need only include the magnetic recording medium according to one aspect of the present invention, and a well-known technology can be applied to the others.

For example, in a case of recording data and/or reproducing recorded data, first, tracking using the servo signal is performed. That is, by causing the servo signal reading element to follow a predetermined servo track, the element for data is controlled to pass on the target data track. Displacement of the data track is performed by changing a servo track read by the servo signal reading element in a tape width direction.

The recording and reproducing head can also perform recording and/or reproduction with respect to other data bands. In this case, the servo signal reading element need only be displaced to a predetermined servo band using the above described UDIM information to start tracking for the servo band.

EXAMPLES

Hereinafter, the present invention will be described based on Examples. Note that the present invention is not limited to the embodiments shown in Examples. "Parts" and "%" in the following description mean "parts by mass" and "mass %", unless otherwise specified. "eq" indicates equivalent and is a unit not convertible into SI unit. The steps and evaluations in the following description were performed in an environment of an atmosphere temperature of 23° C.±1° C., unless otherwise noted.

Example 1

<Production of ε-Iron Oxide Powder>

411.7 g of iron(III) nitrate nonahydrate ("Fe nitrate" in Table 1), 73.8 g of gallium(III) nitrate octahydrate ("Ga nitrate" in Table 1), 9.1 g of cobalt(II) nitrate hexahydrate ("Co nitrate" in Table 1), and 7.4 g of titanium(IV) sulfate ("Ti sulfate" in Table 1) were dissolved in 5,000 g of pure water, and while the dissolved product was stirred, 180 g of an aqueous ammonia solution having a concentration of 25% was added to the dissolved product under a condition of an atmosphere temperature of 25° C. in an air atmosphere, and the dissolved product was stirred for 2 hours while maintaining a temperature condition of the atmosphere temperature of 25° C. A citric acid aqueous solution obtained by dissolving 48 g of citric acid in 400 g of pure water was added to the obtained solution and stirred for 1 hour. The powder sedimented after the stirring was collected by centrifugal separation and washed with pure water, then 8,000 g of pure water was added thereto and the powder was dispersed in water again to obtain a dispersion liquid. The obtained dispersion liquid was heated to a liquid temperature of 50° C., and 550 g of an aqueous ammonia solution having a concentration of 25% was dropwise added with stirring. After stirring for 1 hour while maintaining the temperature at 50° C., 800 mL of tetraethoxysilane (TEOS) was dropwise added and was stirred for 24 hours. A powder sedimented by adding 500 g of ammonium sulfate to the obtained reaction solution was collected by centrifugal separation, was washed with pure water, and was dried in a heating furnace at an in-furnace temperature of 90° C. for 24 hours to obtain a ferromagnetic powder precursor.

The obtained ferromagnetic powder precursor was subjected to a heat treatment step under the following conditions using a heating furnace in an air atmosphere. First, the temperature was raised up to a reaching temperature of 1040° C. at a rate of temperature rise of 14° C./min, and the temperature was maintained for 1 minute (Step 1). Subsequently, the temperature was lowered from the reaching temperature of Step 1 to the reaching temperature of 1,000° C. over 1.0 hour (Step 2). Further, the temperature was lowered from the reaching temperature of Step 2 to the reaching temperature of 960° C. over 3.0 hours (Step 3). The reaching temperature described for the heat treatment step is an in-furnace temperature of the heating furnace.

The coat-removing step was executed by putting the powder after the heat treatment into a 4 mol/L sodium hydroxide (NaOH) aqueous solution and stirring the mixture for 24 hours while maintaining the liquid temperature at 80° C. to perform the coat-removing treatment.

Thereafter, the powder subjected to the coat-removing treatment was collected by centrifugal separation, and was washed with pure water.

Composition confirmation of Ferromagnetic powders obtained through the above steps was performed by high-frequency inductively coupled plasma-optical emission spectrometry (ICP-OES), and it was confirmed to be substitution type ε-iron oxide having the composition shown in Table 1. Values shown in Table 1 for the composition are the number of (x, y, z, (2-x-y-z)) of each element in a composition formula: $A_1^x A_2^y A_3^z Fe_{(2-x-y-z)} O_3$. In addition, scanning with CuKα rays was performed under conditions of a voltage of 45 kV and an intensity of 40 mA, an X-ray diffraction pattern was measured under the following conditions (X-ray diffraction analysis), and it was confirmed from a peak of the X-ray diffraction pattern that the obtained ferromagnetic powder had an ε-phase crystal structure of a single phase (ε-iron oxide type crystal structure) not including α-phase and γ-phase crystal structures.

PANalytical X'Pert Pro diffractometer, PIXcel detector
Soller slit of incident beam and diffraction beam: 0.017 radians
Fixed angle of dispersion slit: ¼ degrees
Mask: 10 mm
Anti-scattering slit: ¼ degrees
Measurement mode: continuous
Measurement time per stage: 3 seconds
Measurement speed: 0.017 degrees per second
Measurement step: 0.05 degrees An average particle size of the ferromagnetic powder described above was obtained by the method described above using transmission electron microscope H-9000 manufactured by Hitachi, Ltd. as a transmission electron microscope, and using image analysis software KS-400 manufactured by Carl Zeiss as image analysis software. The obtained average particle size is shown in Table 3 described below.

<Production of Magnetic Tape>
<<Magnetic Layer Forming Composition>>
(Magnetic Liquid)
ε-Iron oxide powder produced above: 100.0 parts
Sulfonic acid group-containing polyurethane resin: 15.0 parts
Cyclohexanone: 150.0 parts
Methyl ethyl ketone: 150.0 parts
(Abrasive Solution)
α-Alumina (average particle size: 110 nm): 9.0 parts
Vinyl chloride copolymer (MR110 manufactured by Kaneka Corporation): 0.7 parts
Cyclohexanone: 20.0 parts
(Protrusion Forming Agent Liquid)
Protrusion forming agent (ATLAS (composite particle of silica and polymer) manufactured by Cabot Corporation, average particle size of 100 nm): 1.3 parts
Methyl ethyl ketone: 9.0 parts
Cyclohexanone: 6.0 parts
(Other Components)
Butyl stearate: 1.0 part
Stearic acid: 1.0 part
Polyisocyanate (CORONATE manufactured by Tosoh Corporation): 2.5 parts
(Finishing Additive Solvent)
Cyclohexanone: 180.0 parts
Methyl ethyl ketone: 180.0 parts
<<Non-Magnetic Layer Forming Composition>>
Non-magnetic inorganic powder (α-iron oxide): 80.0 parts
  (average particle size: 0.15 μm, average acicular ratio: 7, brunauer-emmett-teller (BET) specific surface area: 52 m²/g)
Carbon black (average particle size: 20 nm): 20.0 parts
Electron beam curable vinyl chloride copolymer: 13.0 parts
Electron beam curable polyurethane resin: 6.0 parts
Phenylphosphonic acid: 3.0 parts
Cyclohexanone: 140.0 parts
Methyl ethyl ketone: 170.0 parts
Butyl stearate: 4.0 parts
Stearic acid: 1.0 part <<Back Coating Layer Forming Composition>>
Non-magnetic inorganic powder (α-iron oxide): 80.0 parts
  (average particle size: 0.15 μm, average acicular ratio: 7, BET specific surface area: 52 m²/g)
Carbon black (average particle size: 20 nm): 20.0 parts
Carbon black (average particle size: 100 nm): 3.0 parts
Vinyl chloride copolymer: 13.0 parts
Sulfonic acid group-containing polyurethane resin: 6.0 parts
Phenylphosphonic acid: 3.0 parts
Cyclohexanone: 140.0 parts
Methyl ethyl ketone: 170.0 parts
Stearic acid: 3.0 parts
Polyisocyanate (CORONATE manufactured by Tosoh Corporation): 5.0 parts
Methyl ethyl ketone: 400.0 parts <<Preparation of Each Layer Forming Composition>>

A magnetic layer forming composition was prepared by the following method.

Various components of the magnetic liquid were kneaded and diluted by an open kneader, and then subjected to a dispersion treatment of 12 passes, with a horizontal beads mill dispersing device using zirconia (ZrO₂) beads (hereinafter, referred to as "Zr beads") having a bead diameter of 0.5 mm, by setting a retention time per pass to 2 minutes at a bead filling rate of 80 vol % and a circumferential speed of a rotor distal end of 10 m/sec. Thereby, a magnetic liquid was prepared.

After mixing various components of the above-described abrasive solution, the mixture was put into a vertical sand mill dispersing device together with Zr beads having a bead diameter of 1 mm, a ratio of the bead volume to the total of the abrasive solution volume and the bead volume was adjusted to be 60%, and subjected to a sand mill dispersion treatment for 180 minutes. The liquid after the sand mill dispersion treatment was taken out and subjected to an ultrasonic dispersion filtration treatment using a flow type ultrasonic dispersion filtration device to prepare an abrasive solution.

The various components of the above protrusion forming agent liquid were mixed and then the mixture was subjected to an ultrasonic treatment (dispersion treatment) for 60 minutes at an ultrasonic output of 500 watts per 200 cc by a horn type ultrasonic dispersing device, and the obtained dispersion liquid was filtered using a filter having a pore diameter of 0.5 μm. Thereby, a protrusion forming agent liquid was prepared.

The magnetic liquid, the protrusion forming agent liquid, the abrasive solution, other components, and the finishing additive solvent were introduced into a dissolver stirrer, and the mixture was stirred at a circumferential speed of 10 m/sec for 30 minutes. After that, a dispersion treatment of 2 passes was performed at a flow rate of 7.5 kg/min by a flow type ultrasonic dispersing device, and then the obtained liquid was filtered once through a filter having a pore diameter of 1.0 μm. Thereby, a magnetic layer forming composition was prepared.

A non-magnetic layer forming composition was prepared by the following method.

The components excluding a lubricant (butyl stearate and stearic acid) were kneaded and diluted by an open kneader, and then subjected to a dispersion treatment by a horizontal beads mill dispersing device. After that, the lubricant (butyl stearate and stearic acid) was added into the obtained dispersion liquid and stirred and mixed by a dissolver stirrer to prepare a non-magnetic layer forming composition.

A back coating layer forming composition was prepared by the following method.

The components excluding a lubricant (stearic acid), polyisocyanate, and methyl ethyl ketone (400.0 parts) were kneaded and diluted by an open kneader, and then subjected to a dispersion treatment by a horizontal beads mill dispersing device. After that, the lubricant (stearic acid), polyisocyanate, and methyl ethyl ketone (400.0 parts) were added into the obtained dispersion liquid and stirred and mixed by a dissolver stirrer to prepare a back coating layer forming composition.

<<Production of Magnetic Tape>>

The non-magnetic layer forming composition was applied onto a surface of a biaxially stretched polyethylene naphthalate support having a thickness of 5.0 μm and dried so that the thickness after drying was 1.0 and then, an electron beam was emitted at an acceleration voltage of 125 kV to obtain an energy of 40 kGy. A magnetic layer forming composition was applied thereonto so that the thickness after drying was 0.1 μm, to form a coating layer. While the coating layer is wet, a vertical alignment treatment was performed by applying a magnetic field having a magnetic field intensity of 0.3 T in an alignment zone in a direction perpendicular to a surface of the coating layer, and then the surface of the coating layer was dried. Thereby, a magnetic layer was formed. Thereafter, the back coating layer forming composition was applied onto a surface of the support opposite to the surface on which the non-magnetic layer and the magnetic layer are formed, so that the thickness after drying was 0.5 and dried to form a back coating layer.

After that, a surface smoothing treatment (calendering treatment) was performed using a calender roll formed of only metal rolls at a calendering treatment speed of 80 m/min, a linear pressure of 300 kg/cm (294 kN/m), and a surface temperature of the calender roll of 110° C.

After that, a heat treatment was performed for 36 hours in an environment of an atmosphere temperature of 70° C. After the heat treatment, the resultant was slit to have ½ inches (0.0127 meters) width, and the magnetic layer surface was cleaned with a tape cleaning device in which a nonwoven fabric and a razor blade are attached to a device including a feeding and winding device of the slit so as to press the magnetic layer surface. After that, in a state where the magnetic layer of the magnetic tape was demagnetized, a servo pattern having disposition and a shape according to the linear tape-open (LTO) Ultrium format was formed on the magnetic layer by using a servo write head mounted on a servo writer. In this way, a magnetic tape including a data band, a servo band, and a guide band in the disposition according to the LTO Ultrium format in the magnetic layer and including a servo pattern having the disposition and the shape according to the LTO Ultrium format on the servo band was obtained.

Examples 2 to 13 and Comparative Examples 1 to 7

ε-Iron oxide powder and a magnetic tape were produced in the same manner as in Example 1, except that the various items shown in Tables 1 and 2 described below were changed as shown in Tables 1 and 2. In Table 1, "Al nitrate" is an aluminum(III) nitrate nonahydrate, and "Sn chloride" is a tin(IV) chloride pentahydrate.

Comparative Example 8

The heat treatment step was executed in the same manner as in Comparative Example 1, and an ε-iron oxide powder and a magnetic tape were produced in the same manner as in Example 1, except that the step after the coat-removing step was changed to the following step.

The powder after the coat-removing step was mixed with 190 g of pure water, redispersed by a homogenizer, and the pH was adjusted to 10.0 with ammonia water having a concentration of 25% to obtain a dispersion liquid in which particles of the powder were dispersed. The obtained dispersion liquid was subjected to first centrifugal separation for 14 hours with a centrifugal force of 15200 G (gravitational acceleration) using a centrifuge, and then the supernatant solution and the sediment were separated by decantation.

The obtained sediment was washed with pure water and dried in a dryer having an internal atmosphere temperature of 95° C. for 24 hours to obtain ferromagnetic powder.

Comparative Example 9

A magnetic tape was produced in the same manner as in Example 1, except that the ε-iron oxide powder was produced by the following method according to Example 1 of the specification of JP6010181B.

413.0 g of iron(III) nitrate nonahydrate, 72.4 g of gallium (III) nitrate octahydrate, 9.1 g of cobalt(II) nitrate hexahydrate, and 7.4 g of titanium(IV) sulfate were dissolved in 4222 g of pure water, and while the dissolved product was stirred, 252 g of an aqueous ammonia solution having a concentration of 21.85% was added at once to the dissolved product under a condition of an atmosphere temperature of 20° C. in an air atmosphere, and the dissolved product was stirred for 2 hours while maintaining a temperature condition of the atmosphere temperature of 20° C. A citric acid aqueous solution obtained by dissolving 23.6 g of citric acid in 212 g of pure water was added to the obtained solution over 1 hour, and then 280 g of an aqueous ammonia solution having a concentration of 10% was added thereto at once. Subsequently, the mixture was stirred for 1 hour while maintaining a temperature of 20° C. to obtain a slurry.

The obtained slurry was washed with an ultra-filtration membrane (a membrane with an ultra-filtration (UF) fractional molecular weight of 50,000) until the electrical conductivity of the furnace liquid was 3.8 mS/m or less.

The washed slurry was fractionated by an amount containing 16.8 g of the powder, and pure water was added so that the amount of the liquid was 4,000 mL. While stirring the mixture under a condition of a liquid temperature of 30° C., 59.80 g of an aqueous ammonia solution having a concentration of 21.45% was added, and then 117.23 g of TEOS was added over 35 minutes. After that, the stirring was continued for 20 hours. A solution prepared by dissolving 181.0 g of ammonium sulfate in 300 g of pure water was added to the obtained liquid. The sedimented powder was collected by centrifugal separation, was washed with pure water, and was dried in a heating furnace at an in-furnace temperature of 90° C. for 24 hours, to obtain a ferromagnetic powder precursor.

A temperature of the obtained ferromagnetic powder precursor was raised up to a final reaching temperature of 1065° C. at a rate of temperature rise of 4° C./min by using a heating furnace in an air atmosphere, and the temperature was maintained for 4 hours to execute a heat treatment step (one-stage temperature rise).

The powder after the heat treatment step was put into a 6.25 mol/L sodium hydroxide (NaOH) aqueous solution, and the mixture was stirred for 24 hours while maintaining the liquid temperature at 70° C. to perform the coat-removing treatment.

Thereafter, the powder subjected to the coat-removing step was collected by centrifugal separation, and was washed with pure water.

The compositions of the ferromagnetic powders produced in Examples 2 to 13 and Comparative Examples 1 to 8 were analyzed in the same manner as described above. Table 1 shows the analysis results of the compositions. In addition, the produced ferromagnetic powder was subjected to X-ray diffraction analysis in the same manner as described above, and it was confirmed that each powder had an ε-phase crystal structure of a single phase (ε-iron oxide type crystal structure). In addition, the results of obtaining the average particle size of each ferromagnetic powder in the same manner as in Example 1 are shown in Table 3 described below.

For each of Examples and Comparative Examples described above, two magnetic tapes were produced, one used for evaluation of a signal-to-noise ratio (SNR) described below and the other used for the other evaluation.

[Evaluation Method]

<SFD and Inclination of SFD>

A sample piece having a size of 3.6 cm×3.2 cm (area: 11.5 cm$^2$) was cut out from each of the magnetic tapes of Examples and Comparative Examples. For this sample piece, SFD's at measurement temperatures of 10° C., 25° C., and 40° C. were obtained by the method described above by using TM-VSM6050-SM type manufactured by Tamakawa Co., Ltd. as a vibrating sample magnetometer. The measurement temperature was controlled using liquid nitrogen or a heater. Table 3 shows SFD at the measurement temperature of 25° C. obtained in this way. In addition, for the above three measurement temperatures, a relationship between the measurement temperature and SFD was linearly approximated by a least square method to calculate a rate of change of SFD with respect to the measurement temperature, and this calculated value is shown as the inclination of SFD in Table 3.

<Evaluation of Deterioration in Electromagnetic Conversion Characteristics in Use Under Different Temperature Conditions>

For each magnetic tape of Examples and Comparative Examples, an SNR was measured by the following method in an environment of an atmosphere temperature of 23° C. and a relative humidity of 50%. The obtained SNR is expressed as "$SNR_{23/50}$".

Using a ½ inches (0.0127 meters) reel tester with a fixed magnetic head, a running speed of the magnetic tape (relative speed between the magnetic head and the magnetic tape) was set to 4 m/sec. A metal-in-gap (MIG) head (gap length of 0.15 track width of 1.0 μm) was used as a recording head, and a recording current was set to the optimum recording current of each magnetic tape. As a reproducing head, a giant-magnetoresistive (GMR) head having an element thickness of 15 nm, a shield interval of 0.1 and a lead width of 0.5 μm was used. The signal was recorded at a linear recording density of 300 kfci, and the reproduced signal was measured by a spectrum analyzer manufactured by Advantest Corporation. In addition, the unit kfci is a unit of linear recording density (cannot be converted to SI unit system). A ratio of an output value of a carrier signal to an integrated noise in the entire spectrum band was defined as an SNR. For the SNR measurement, a signal of a portion of the magnetic tape, in which a signal was sufficiently stable after the magnetic tape began running, was used.

After that, for each magnetic tape, an SNR was measured by the above-described method in an environment of an atmosphere temperature of 40° C. and a relative humidity of 80%. The obtained SNR is expressed as "$SNR_{40/80}$".

Table 3 shows a difference ($SNR_{40/80}$-$SNR_{23/50}$) between the SNR's obtained above. In a case where a value of the difference is within −2.0 dB, it can be said that the deterioration in electromagnetic conversion characteristics in use under different temperature conditions is suppressed.

TABLE 1

| | Raw material charging amount (g) | | | | | | Composition | | | | | |
|---|---|---|---|---|---|---|---|---|---|---|---|---|
| | Fe nitrate | Ga nitrate | Al nitrate | Co nitrate | Ti sulfate | Sn chloride | Fe | Ga | Al | Co | Ti | Sn |
| Example 1 | 411.7 | 73.8 | 0.0 | 9.1 | 7.4 | 0.0 | 1.63 | 0.27 | 0.0 | 0.05 | 0.05 | 0.00 |
| Example 2 | 391.5 | 112.1 | 0.0 | 3.6 | 3.0 | 0.0 | 1.55 | 0.41 | 0.0 | 0.02 | 0.02 | 0.00 |
| Example 3 | 419.3 | 54.7 | 0.0 | 12.7 | 10.4 | 0.0 | 1.66 | 0.20 | 0.0 | 0.07 | 0.07 | 0.00 |
| Example 4 | 411.7 | 73.8 | 0.0 | 9.1 | 7.4 | 0.0 | 1.63 | 0.27 | 0.0 | 0.05 | 0.05 | 0.00 |
| Example 5 | 416.8 | 62.9 | 0.0 | 10.9 | 8.9 | 0.0 | 1.65 | 0.23 | 0.0 | 0.06 | 0.06 | 0.00 |
| Example 6 | 416.8 | 62.9 | 0.0 | 10.9 | 8.9 | 0.0 | 1.65 | 0.23 | 0.0 | 0.06 | 0.06 | 0.00 |
| Example 7 | 421.8 | 46.5 | 0.0 | 14.6 | 11.8 | 0.0 | 1.67 | 0.17 | 0.0 | 0.08 | 0.08 | 0.00 |
| Example 8 | 401.6 | 84.7 | 0.0 | 9.1 | 7.4 | 0.0 | 1.59 | 0.31 | 0.0 | 0.05 | 0.05 | 0.00 |
| Example 9 | 416.8 | 62.9 | 0.0 | 10.9 | 8.9 | 0.0 | 1.65 | 0.23 | 0.0 | 0.06 | 0.06 | 0.00 |
| Example 10 | 439.5 | 0.0 | 0.0 | 23.7 | 19.2 | 0.0 | 1.74 | 0.00 | 0.00 | 0.13 | 0.13 | 0.00 |
| Example 11 | 411.7 | 73.8 | 0.0 | 9.1 | 0.0 | 10.8 | 1.63 | 0.27 | 0.00 | 0.05 | 0.00 | 0.05 |
| Example 12 | 404.1 | 0.0 | 76.9 | 9.1 | 7.4 | 0.0 | 1.60 | 0.00 | 0.30 | 0.05 | 0.05 | 0.00 |
| Example 13 | 404.1 | 0.0 | 76.9 | 9.1 | 0.0 | 10.8 | 1.60 | 0.00 | 0.30 | 0.05 | 0.00 | 0.05 |
| Comparative Example 1 | 373.8 | 142.1 | 0.0 | 0.0 | 0.0 | 0.0 | 1.48 | 0.52 | 0.00 | 0.00 | 0.00 | 0.00 |
| Comparative Example 2 | 373.8 | 142.1 | 0.0 | 0.0 | 0.0 | 0.0 | 1.48 | 0.52 | 0.00 | 0.00 | 0.00 | 0.00 |
| Comparative Example 3 | 419.3 | 54.7 | 0.0 | 12.7 | 10.4 | 0.0 | 1.66 | 0.20 | 0.00 | 0.07 | 0.07 | 0.00 |
| Comparative Example 4 | 421.8 | 46.5 | 0.0 | 14.6 | 11.8 | 0.0 | 1.67 | 0.17 | 0.00 | 0.08 | 0.08 | 0.00 |
| Comparative Example 5 | 411.7 | 73.8 | 0.0 | 9.1 | 7.4 | 0.0 | 1.63 | 0.27 | 0.00 | 0.05 | 0.05 | 0.00 |
| Comparative Example 6 | 401.6 | 84.7 | 0.0 | 9.1 | 7.4 | 0.0 | 1.59 | 0.31 | 0.00 | 0.05 | 0.05 | 0.00 |
| Comparative Example 7 | 416.8 | 62.9 | 0.0 | 10.9 | 8.9 | 0.0 | 1.65 | 0.23 | 0.00 | 0.06 | 0.06 | 0.00 |
| Comparative Example 8 | 411.7 | 73.8 | 0.0 | 9.1 | 7.4 | 0.0 | 1.63 | 0.27 | 0.00 | 0.05 | 0.05 | 0.00 |
| Comparative Example 9 | 413.0 | 72.4 | 0.0 | 9.1 | 7.4 | 0.0 | 1.64 | 0.27 | 0.00 | 0.05 | 0.05 | 0.00 |

TABLE 2

| | Heat treatment step | | | | | | |
|---|---|---|---|---|---|---|---|
| | Step 1 | | | Step 2 | | Step 3 | |
| | Rate of temperature rise (° C./min) | Reaching temperature (° C.) | Maintenance time (min) | Reaching time (hour) | Reaching temperature (° C.) | Reaching time (hour) | Reaching temperature (° C.) |
| Example 1 | 14 | 1040 | 1 | 1.0 | 1000 | 3.0 | 960 |
| Example 2 | 4 | 1030 | 1 | 0.5 | 1010 | 3.5 | 970 |
| Example 3 | 14 | 1040 | 1 | 1.0 | 1000 | 3.0 | 960 |
| Example 4 | 14 | 1040 | 1 | 2.0 | 1000 | 2.0 | 950 |
| Example 5 | 14 | 1060 | 1 | 2.0 | 1000 | 2.0 | 950 |
| Example 6 | 14 | 1030 | 1 | 2.0 | 990 | 2.0 | 950 |
| Example 7 | 14 | 1040 | 1 | 2.0 | 1000 | 2.0 | 950 |
| Example 8 | 14 | 1030 | 1 | 2.0 | 980 | 2.0 | 940 |
| Example 9 | 14 | 1090 | 1 | 1.0 | 1030 | 3.0 | 990 |
| Example 10 | 14 | 1040 | 1 | 1.0 | 1000 | 3.0 | 960 |
| Example 11 | 14 | 1040 | 1 | 1.0 | 1000 | 3.0 | 960 |
| Example 12 | 14 | 1040 | 1 | 1.0 | 1000 | 3.0 | 960 |
| Example 13 | 14 | 1040 | 1 | 1.0 | 1000 | 3.0 | 960 |
| Comparative Example 1 | 4 | 1015 | 240 | — | — | — | — |
| Comparative Example 2 | 14 | 1040 | 1 | 2.0 | 1000 | 2.0 | 950 |
| Comparative Example 3 | 4 | 1015 | 240 | — | — | — | — |

TABLE 2-continued

<table>
<tr><th></th><th colspan="3">Heat treatment step</th><th></th><th></th><th></th><th></th></tr>
<tr><th></th><th colspan="3">Step 1</th><th colspan="2">Step 2</th><th colspan="2">Step 3</th></tr>
<tr><th></th><th>Rate of temperature rise (° C./min)</th><th>Reaching temperature (° C.)</th><th>Maintenance time (min)</th><th>Reaching time (hour)</th><th>Reaching temperature (° C.)</th><th>Reaching time (hour)</th><th>Reaching temperature (° C.)</th></tr>
<tr><td>Comparative Example 4</td><td>4</td><td>1040</td><td>1</td><td>2.5</td><td>990</td><td>2.5</td><td>960</td></tr>
<tr><td>Comparative Example 5</td><td>20</td><td>1060</td><td>1</td><td>3.0</td><td>980</td><td>3.0</td><td>940</td></tr>
<tr><td>Comparative Example 6</td><td>14</td><td>1025</td><td>1</td><td>2.0</td><td>975</td><td>2.0</td><td>935</td></tr>
<tr><td>Comparative Example 7</td><td>14</td><td>1100</td><td>1</td><td>1.0</td><td>1040</td><td>3.0</td><td>1000</td></tr>
<tr><td>Comparative Example 8</td><td>4</td><td>1015</td><td>240</td><td>—</td><td>—</td><td>—</td><td>—</td></tr>
<tr><td>Comparative Example 9</td><td>4</td><td>1065</td><td>240</td><td>—</td><td>—</td><td>—</td><td>—</td></tr>
</table>

TABLE 3

| | Average particle size of ferromagnetic powder (nm) | SFD at 25° C. | Inclination of SFD (° C.$^{-1}$) | Evaluation SNR$_{40/80}$ − SNR$_{23/50}$ |
|---|---|---|---|---|
| Example 1 | 12.5 | 1.41 | 0.036 | 0 dB |
| Example 2 | 12.8 | 1.72 | 0.080 | −2.0 dB |
| Example 3 | 12.7 | 1.22 | 0.012 | 0 dB |
| Example 4 | 12.6 | 1.21 | 0.015 | 0 dB |
| Example 5 | 15.2 | 0.95 | 0.008 | 0 dB |
| Example 6 | 9.2 | 1.74 | 0.008 | 0 dB |
| Example 7 | 12.8 | 0.88 | 0.003 | −2.0 dB |
| Example 8 | 8.6 | 3.00 | 0.056 | −1.8 dB |
| Example 9 | 18.9 | 0.20 | 0.004 | −1.8 dB |
| Example 10 | 12.4 | 1.60 | 0.040 | 0 dB |
| Example 11 | 12.5 | 1.52 | 0.048 | −0.5 dB |
| Example 12 | 12.4 | 1.49 | 0.045 | −0.5 dB |
| Example 13 | 12.6 | 1.58 | 0.052 | −0.8 dB |
| Comparative Example 1 | 12.5 | 1.80 | 0.095 | −10.0 dB |
| Comparative Example 2 | 12.6 | 1.63 | 0.085 | −5.0 dB |
| Comparative Example 3 | 12.7 | 1.74 | 0.086 | −5.0 dB |
| Comparative Example 4 | 13.0 | 0.95 | 0.002 | −5.0 dB |
| Comparative Example 5 | 14.2 | 0.73 | 0.002 | −5.0 dB |
| Comparative Example 6 | 8.1 | 3.31 | 0.066 | −2.2 dB |
| Comparative Example 7 | 23.1 | 0.17 | 0.004 | −2.2 dB |
| Comparative Example 8 | 12.1 | 0.89 | 0.085 | −5.0 dB |
| Comparative Example 9 | 18.1 | 0.71 | 0.084 | −5.0 dB |

From the results shown in Table 3, it can be confirmed that the deterioration in electromagnetic conversion characteristics (SNR) in different temperature environments is suppressed in the magnetic tapes of Examples as compared with the magnetic tapes of Comparative Examples.

One aspect of the present invention is effective in data storage applications.

What is claimed is:

1. A magnetic recording medium comprising:
    a non-magnetic support; and
    a magnetic layer containing a ferromagnetic powder,
    wherein the ferromagnetic powder is an ε-iron oxide powder,
    a vertical switching field distribution SFD of the magnetic recording medium is 0.20 or more and 3.00 or less at a measurement temperature of 25° C., and
    an inclination of SFD obtained from SFD at a measurement temperature of 10° C., SFD at a measurement temperature of 25° C., and SFD at a measurement temperature of 40° C. is 0.003° C.$^{-1}$ or more and 0.080° C.$^{-1}$ or less.

2. The magnetic recording medium according to claim 1, wherein the inclination of SFD is 0.005° C.$^{-1}$ or more and 0.050° C.$^{-1}$ or less.

3. The magnetic recording medium according to claim 1, wherein the SFD at the measurement temperature of 25° C. is 0.50 or more and 2.00 or less.

4. The magnetic recording medium according to claim 2, wherein the SFD at the measurement temperature of 25° C. is 0.50 or more and 2.00 or less.

5. The magnetic recording medium according to claim 1, wherein the ε-iron oxide powder contains a cobalt element.

6. The magnetic recording medium according to claim 5, wherein the ε-iron oxide powder further contains an element selected from the group consisting of a gallium element and an aluminum element.

7. The magnetic recording medium according to claim 5, wherein the ε-iron oxide powder further contains an element selected from the group consisting of a titanium element and a tin element.

8. The magnetic recording medium according to claim 6, wherein the ε-iron oxide powder further contains an element selected from the group consisting of a titanium element and a tin element.

9. The magnetic recording medium according to claim 2, wherein the ε-iron oxide powder contains a cobalt element.

10. The magnetic recording medium according to claim 9, wherein the ε-iron oxide powder further contains an element selected from the group consisting of a gallium element and an aluminum element, and further contains an element selected from the group consisting of a titanium element and a tin element.

11. The magnetic recording medium according to claim 3, wherein the ε-iron oxide powder contains a cobalt element.

12. The magnetic recording medium according to claim 11,
wherein the ε-iron oxide powder further contains an element selected from the group consisting of a gallium element and an aluminum element, and further contains an element selected from the group consisting of a titanium element and a tin element.

13. The magnetic recording medium according to claim 4, wherein the ε-iron oxide powder contains a cobalt element.

14. The magnetic recording medium according to claim 13,
wherein the ε-iron oxide powder further contains an element selected from the group consisting of a gallium element and an aluminum element, and further contains an element selected from the group consisting of a titanium element and a tin element.

15. The magnetic recording medium according to claim 1, further comprising:
a non-magnetic layer containing a non-magnetic powder between the non-magnetic support and the magnetic layer.

16. The magnetic recording medium according to claim 1, further comprising:
a back coating layer containing a non-magnetic powder on a surface side of the non-magnetic support opposite to a surface side on which the magnetic layer is provided.

17. The magnetic recording medium according to claim 1, wherein the magnetic recording medium is a magnetic tape.

18. A magnetic tape cartridge comprising:
the magnetic tape according to claim 17.

19. A magnetic recording and reproducing device comprising:
the magnetic recording medium according to claim 1.

* * * * *